United States Patent [19]

Hark et al.

[11] 4,207,018
[45] Jun. 10, 1980

[54] FLUID PRESSURIZING STATION FOR A PIPELINE CONVEYOR

[75] Inventors: William B. Hark, Reading; Peter J. Baker, Dunstable; Alan Headford, Wooton; Barry E. A. Jacobs, Bromham, all of England

[73] Assignee: The British Hydromechanics Research Association, Cranfield, England

[21] Appl. No.: 969,691

[22] Filed: Dec. 15, 1978

[30] Foreign Application Priority Data

Nov. 7, 1978 [GB] United Kingdom ............... 43538/78

[51] Int. Cl.² .............................................. B65G 51/04
[52] U.S. Cl. .................................................. 406/105
[58] Field of Search .......................... 406/93, 94, 105; 104/138 R, 154, 155

[56] References Cited

U.S. PATENT DOCUMENTS

| 1,753,987 | 4/1930 | Hohne | 406/105 X |
| 3,999,487 | 12/1976 | Valverde | 406/105 X |
| 4,017,039 | 4/1977 | Carstens | 406/105 |

FOREIGN PATENT DOCUMENTS 1436983 5/1976 United Kingdom ............... 406/105

*Primary Examiner*—Jeffrey V. Nase
*Attorney, Agent, or Firm*—Blanchard, Flynn, Thiel, Boutell & Tanis

[57] ABSTRACT

A pressurizing station (1) for a pipeline conveyor (2) includes a transfer conduit (5) for the passage of load-carrying capsules (3) between upstream and downstream portions (4 and 6) of the pipeline (4, 5 and 6) and a reverse, by-pass conduit (20) extending between outlet and inlet conduits (9 and 10) respectively connected to upstream and downstream ends (7 and 8) of the transfer conduit (5). A fan (36) is provided between the outlet and inlet conduits (9 and 10). A valve member (17) is mounted on an axis extending transversely of the transfer conduit (5) and is movable, in response to fluid flow through the pressurizing station (1), between a closed position, in which first and second opposite ends (21 and 22) of the valve member (17) respectively extend across the transfer conduit (5) and across the reverse, by-pass conduit (20), and an open position in which the first end (21) of the valve member (17) is clear of the path of capsules (3) travelling through the transfer conduit (5).

6 Claims, 1 Drawing Figure

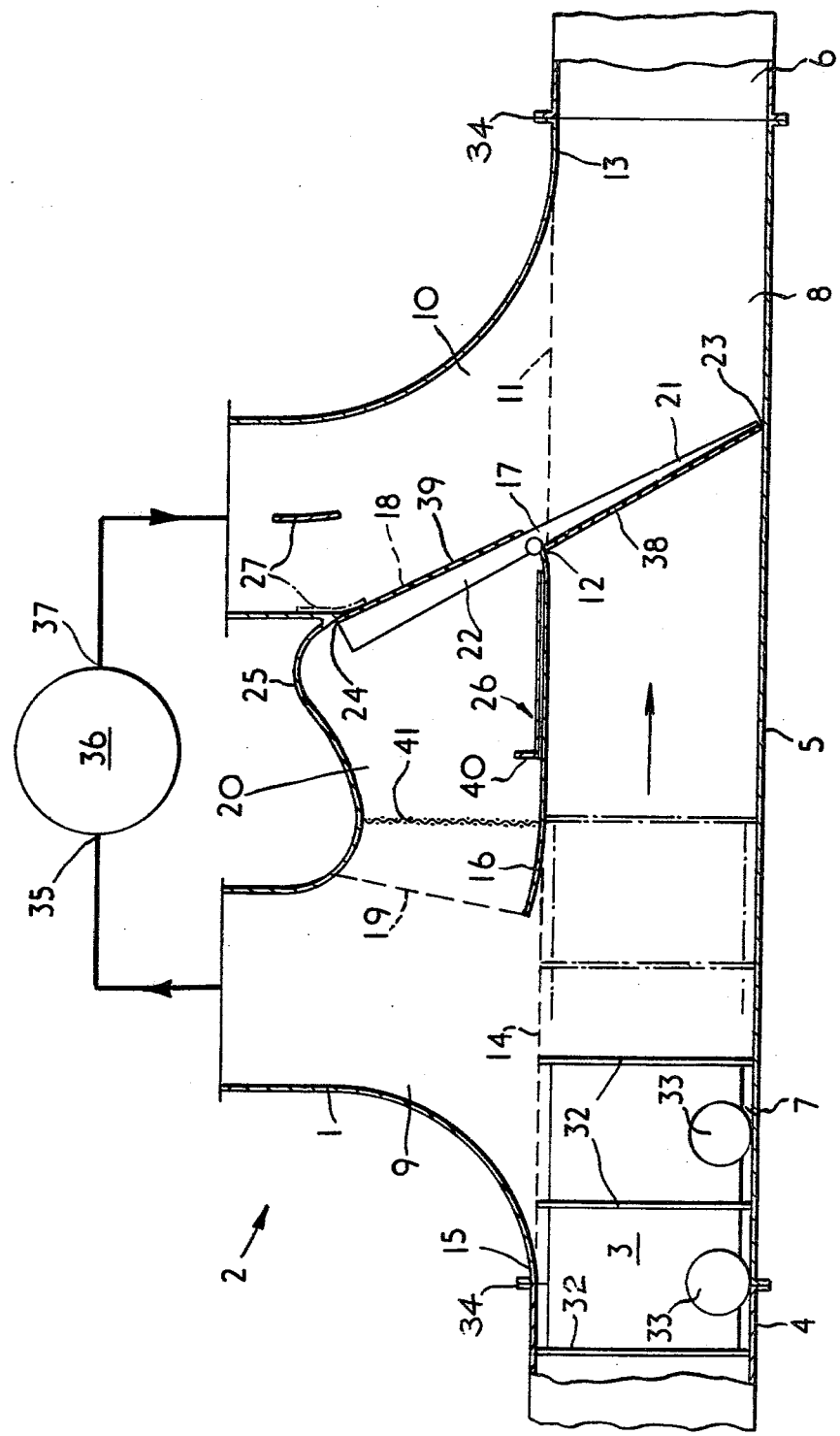

FLUID PRESSURIZING STATION FOR A PIPELINE CONVEYOR

FIELD OF THE INVENTION

The invention relates to pipeline conveyors in which load-carrying capsules are conveyed along a pipeline by means of a fluid flowing through the pipeline. Normally, the driving fluid employed is air, although water can also be used. In conveyors of this kind, it is sometimes an objective to transfer a fluid such as oil or combustible gas from one locality to another and so in this case these fluids can be utilized as a driving fluid for conveying load-carrying capsules. For long pipelines the pressure to be supplied to the fluid may be inconveniently large to bhe provided by one pumping station and so fluid pressurising stations are provided at spaced points along the pipeline, between the upstream and downstream portions of the pipeline. It is pressurising stations such as this with which the present invention is particularly concerned.

BACKGROUND ART

Where fluid pressurising stations are provided between the upstream and downstream portions of a conveyor pipeline, it is preferred that the capsules should remain in the pipeline as they pass through the fluid pressurising station and that they should progress continuously through the fluid pressurising station.

This is achieved by providing fluid pressurising stations, for a pipeline conveyor in which load-carrying capsules are conveyed along a pipeline by means of a fluid flowing along the pipeline, comprising a transfer conduit having upstream and downstream ends respectively connectable to upstream and downstream portions of the pipeline for the passage of load-carrying capsules; outlet and inlet conduits respectively connected to the upstream and downstream ends of the transfer conduit to allow fluid to flow from the upstream portion of the pipeline and to allow pressurised fluid to be fed into the downstream portion of the pipeline; an inlet port interconnecting the inlet conduit and the downstream end of the transfer conduit and having upstream and downstream edges at the intersection between the inlet conduit and the downstream end of the transfer conduit; an outlet port interconnecting the outlet conduit and the upstream end of the transfer conduit and having upstream and downstream edges at the intersection between the outlet conduit and the upstream end of the transfer conduit; and valve means mounted in the transfer conduit for pivotal movement about an axis extending transversely of the transfer conduit at or adjacent the upstream edge of the inlet port.

Fluid pressurising stations such as this, for transporting load-carrying capsules by means of a pneumatic fluid flow, are described in the specifications of British Patent Specification No. 1 436 983 granted to the British Hydromechanics Research Association and U.S. Pat. No. 4,017,039 in the name of Georgia Tech. and, in these cases, the outlet and inlet conduits are respectively connected to the inlet and outlet ports of a fan so that air withdrawn from an upstream portion of the pipeline is pressurised by the fan and then re-introduced into a downstream portion of the pipeline. In both arrangements, motion of capsules along the pipeline and into the transfer conduit causes a build-up in pressure in the air between the capsule and the valve member and this increase in pressure causes the valve member to rotate about its pivotal axis so as to allow the passage of the capsule through the transfer conduit and into the downstream portion of the pipeline.

While these arrangements operate reasonably satisfactorily for fast moving capsules and for capsules which prevent pressurised fluid in front of the capsules from escaping too readily through the clearance between the capsules and the pipeline, because the valve member is pivoted out of the path of the capsule by means of pressure built up ahead of a capsule, it is clear that operation of the valve member can only take place at the expense of retardation of the capsule in its motion through the pressurising station. Moreover, if the pressure downstream of the valve member is sufficiently high, the pressure built up ahead of the capsule will be insufficient to open the valve member.

Difficulty is also encountered on some occasions when the capsules are not travelling at high speed as, for example, when restarting a capsule from rest. In this situation, the build-up of fluid pressure between the capsule and the valve member is not sufficient to cause the valve member to pivot out of the path of the capsule and capsules make frequent contact with the valve member. These impacts cause damage both to the capsules and to the valve member.

It has also been found that, when the valve member has been deflected out of the path of the capsules, it restricts the flow of fluid through the inlet port into the downstream portion of the pipeline, thus imposing intermittent excessive loading on the fluid pressurising means. This results either in loss of efficiency of the pressurising means or intermittent retardation of the fluid flow so that when the valve member is returned to its closed position there is an appreciable lag while the fluid flowing into the downstream portion of the pipeline accelerates back to its normal steady state and this restriction of flow causes a downward force on the valve member which may cause it to contact the capsule passing underneath it.

DISCLOSURE OF THE INVENTION

It is intended that the present invention should provide a fluid pressurising station in which these known disadvantages are at least partly avoided and this object is achieved by ensuring that first and second by-pass ports are respectively formed in the inlet and outlet conduits; a reverse by-pass conduit extends between the first and second by-pass ports; the first by-pass port has an edge at or adjacent the upstream edge of the inlet port; and the valve member has first and second opposite ends, is movable into a first, closed position in which the opposite ends respectively extend across the transfer conduit to at least partially close the transfer conduit and close the first by-pass port as a result of fluid entering the downstream end of the transfer conduit through the inlet conduit whenever the transfer conduit between the upstream edge of the inlet port and the downstream edge of the outlet port is free of capsules, and is movable into a second, open position in which the opposite ends of the valve member respectively extend into the inlet port and along the reverse by-pass conduit as a result of movement of part of a load-carrying capsule into part of the transfer conduit between the upstream edge of the inlet port and the downstream edge of the outlet port and consequent fluid flow through the reverse by-pass conduit from the inlet conduit to the outlet conduit.

Thus, according to the invention, there is provided a fluid pressurising station, for a pipeline conveyor in which load-carrying capsules are conveyed along a pipeline by means of fluid flowing along the pipeline, comprising a transfer conduit having upstream and downstream ends respectively connectable to upstream and downstream portions of the pipeline for the passage of load-carrying capsules; outlet and inlet conduits respectively connected to the upstream and downstream ends of the transfer conduit to allow fluid to flow from the upstream portion of the pipeline and to allow pressurised fluid to be fed into the downstream portion of the pipeline; a reverse by-pass conduit extending between first and second by-pass ports formed respectively in the inlet and outlet conduits; and a valve member, mounted for pivotal movement about an axis extending transversely of the transfer conduit at or adjacent the upstream edge of an inlet port interconnecting the inlet conduit and the downstream end of the transfer conduit, is movable into a first, closed position in which opposite ends of the valve member respectively extend across the transfer conduit to at least partially close the transfer conduit and close the first by-pass port as a result of fluid entering the downstream end of the transfer conduit through the inlet port whenever the transfer conduit between the inlet port and an outlet port interconnecting the outlet conduit and the upstream end of the transfer conduit is free of capsules, and is movable into a second, open position in which the opposite ends respectively extend into the inlet port and along the by-pass conduit as a result of movement of part of a load-carrying capsule into part of the transfer conduit between the upstream edge of the inlet port and the downstream edge of the outlet port and consequent fluid flow through the reverse by-pass conduit from the inlet conduit to the outlet conduit.

In operation of the fluid pressurising station, fluid flowing through the inlet conduit and into the downstream end of the transfer conduit acts through the centre of pressure of the valve member and this centre of pressure is chosen in relation to the centre of gravity of the valve member and the pivotal axis of the valve member so that the valve member is urged into its first, closed position. Thus, in one convenient form of construction, the pivotal axis passes through the centre of gravity of the valve member and the centre of pressure is disposed on the transfer conduit side of the pivotal axis.

On forward movement of a load-carrying capsule so that at least part of the load-carrying capsule occupies a part of the transfer conduit, between the inlet and outlet ports, there is a rise in the pressure of the fluid in the transfer conduit between the load-carrying capsule and the valve member. This has a destabilizing influence on the valve member, thus allowing the valve member to move away from its first, closed position and allowing an increase in the fluid pressure on the upstream side of the first end of the valve member which projects into the transfer conduit. At the same time, the second end of the valve member moves out of closing engagement with the first by-pass port and so pressurised fluid is able to flow from the inlet conduit and through the reverse by-pass conduit to the outlet conduit. This reverse flow of fluid causes the valve member to move further from its first, closed position into its second, open position in which the opposite ends of the valve member extend into the inlet port and along the reverse by-pass conduit.

Although the first end of the valve member may completely close the transfer conduit when the valve member is in its first, closed position, it is possible to provide for controlled leakage from the downstream end of the transfer conduit to the upstream end of the transfer conduit when the valve member is in its first, closed position. With this form of construction, any fluid leaking upstream along the transfer conduit, past the valve member, is immediately reduced in pressure to the approximate value of the pressure of the fluid flowing from the upstream portion of the pipeline through the outlet conduit. Thus, the initial opening movement of the valve member may occur as a result of the forward movement of the capsule and/or of the leakage of fluid upstream of the transfer conduit, past the valve member, and this will occur even if the load-carrying capsule has come to rest, provided that at least part of the load-carrying occupies part of the transfer conduit between the inlet and outlet ports.

Thus, a major advantage of pressurising stations according to the invention is that it is possible to modify the construction so that the valve member will move to its second, open position merely as a result of the presence of a capsule in the transfer conduit between the inlet and outlet ports. This results in fewer collisions between capsules and the valve member at low capsule velocity.

A further advantage, derived from the use of the reverse by-pass conduit, is that there is less flow disturbance caused to the fluid pessurising means supplying pressurised fluid through the inlet conduit. The fluid flow through the pressurising means may be maintained at a relatively constant level by diverting fluid from its path into the downstream portion of the pipeline so that it flows through the reverse by-pass duct when the valve member is moved into its second, open position to allow passage of capsules through the transfer conduit. Without this reverse by-pass conduit, the fluid pressurising means are temporarily mismatched with respect to flow and pressure. As a result of this mismatch, it can take an appreciable time before full flow of pressurised fluid is re-established, thus resulting in loss of efficiency.

A still further advangtage of pressurising stations according to the invention is that the valve member is opened with only very little loss of kinetic energy of the capsules because the greater part of the energy required is supplied by the pressurised fluid.

As a result of the reduced net forces acting on the valve member, the valve member is caused to shut less violently, thus reducing the transient forces on the valve member and so prolonging its life. As the valve member moves into its second, open position it must be brought to rest and its kinetic energy must be dissipated. This is necessary to prevent the valve member from rebounding so that its first end moves back into the path of a capsule moving through the pressurising station. Deceleration of the valve member may be effected by means of damping means. These damping means are particularly useful when the capsules are being propelled along the pipeline by means of a low viscosity fluid such as air.

In order to expedite closing movement of the valve member from its second, open position to its first, closed position, the cross section of the reverse by-pass conduit, adjacent the first by-pass port, is enlarged with a bulbous portion so that, as the outer edge of the second end of the valve member sweeps across a surface of revolution during final closing movement of the valve member away from its second open position towards its first, closed position, the space between the outer edge and the bulbous portion remains equal to or greater than the space between this outer edge and the first by-pass port. This bulbous portion preferably subtends about one third of the angular opening movement of the valve member. In fact, the bulbous portion is preferably shaped so that planes extending perpendicular to the pivotal axis of the valve member intersect the bulbous member in arcuate curves to which a plane bounded by the edges of the first by-pass port is tangential. Thus, the rate of closure of the gap between the outer edge of the second end of the valve member and the reverse by-pass conduit is decreased so as to defer increase in the velocity of flow of pressurised fluid from the inlet conduit into the reverse by-pass conduit, thus accelerating movement of the valve member into its first, closed position.

Further along the reverse by-pass conduit, on the opposite side of the enlarged cross-section of the reverse by-pass conduit to the first by-pass port, the reverse by-pass conduit may be provided with a restricted cross-section so as to retard the flow of pressurised fluid through the reverse by-pass conduit when the valve member is moving from its second, open position to its first, closed position because, at this stage, flow through the reverse by-pass conduit tends to prevent closing movement of the valve member. This restricted cross-section may have an area of between 0.2 and 1 times the cross-sectional area of the first by-pass port.

In order to control the flow of pressurised fluid through the inlet conduit into the downstream portion of the pipeline, when it is desired to urge the valve member into its first, closed position, the direction of flow of the pressurised fluid may be controlled by guide vanes extending transversely across the inlet conduit along an axis which is perpendicular to a plane containing the axes of the inlet conduit and the transfer conduit. One or more such guide vanes are preferably mounted between the centre line of the inlet conduit and the first by-pass port. Where the inlet conduit is curved, it is preferred that the guide vane is also curved, having a chord length less than one half the hydraulic diameter of the downstream end of the transfer conduit and preferably between 0.1 and 0.2 times this diameter. For this purpose, the hydraulic diameter is defined as equal to four times the flow cross-section of the transfer conduit divided by the periphery of this flow cross-section. Means may also be provided for varying the position of the or each guide vane between the extreme positions hereinbefore mentioned.

An embodiment of the invention is hereinafter described, by way of example, with reference to the accompanying drawing.

BRIEF DESCRIPTION OF THE DRAWING

The accompanying drawing is a schematic sectional side elevation of part of a pneumatic pipeline including a pressurising station in accordance with the invention.

BEST MODE FOR CARRYING OUT THE INVENTION

As shown in the accompanying drawing, a pnuematic pipeline includes an air pressurising station 1 having a transfer conduit 5 situtated between upstream and downstream portions 4 and 6 of a pipeline conveyor 2 in which a flow of air is used to move load-carrying capsules 3. As shown, each capsule 3 is provided with wheels 33, although it is to be understood that the invention is not limited to pipeline conveyors in which the load-carrying capsules are provided with wheels.

The capsule 3 is conveniently of the same cross-sectional shape as the transfer conduit 5 and the upstream and downstream portions 4 and 6 of the pipeline through which it travels and, conveniently, these cross-sections are all circular in shape.

In order to achieve high efficiency of operation, the clearance space between the outer periphery of the capsule 3 and the inner periphery of the pipeline should be reduced to a minimum, consistent with the necessity for the capsule to travel around curved portions of the pipeline and to vary its disposition within the pipeline for other reasons. Thus, as shown in the drawing, it is advisable to provide annular sealing ribs 32 on the external surface of the capsule 3.

The transfer conduit 5 has upstream and downstream ends 7 and 8 respectively connected to the upstream and downstream portions 4 and 6 of the pipeline by connections 34. An air outlet conduit 9 extends from the upstream end 7 of the transfer conduit 5 to the inlet port 35 of a fan 36 and an air inlet conduit 10 extends from the discharge port 37 of the fan 36 to an inlet port 11 in the downstream end 8 of the transfer conduit 5. As shown, the inlet port 11 has upstream and downstream edges 12 and 13. As also shown, the outlet conduit 9 extends from an outlet port 14 in the inlet end 7 of the transfer conduit 5 and has upstream and downstream edges 15 and 16. To ensure good performance of the pressurising station 1, the distance between the upstream edge 12 of the inlet port 11 and the downstream edge 16 of the outlet port 14 should be greater than the spacing between the annular sealing ribs 32 on the capsules 3.

Although the flow of air through the fan 36, between the upstream and downstream ends 7 and 8 of the transfer conduit 5 has been shown as flow along a closed loop, air from the outlet conduit 9 may discharge into the atmosphere and air drawn into the fan 36 may be taken from the atmosphere. Similarly, where driving fluids other than air are used, the driving fluid may be discharged into a reservoir and the driving fluid drawn into the fluid pressurising means may be taken from a reservoir which may or may not be the same reservoir as the reservoir into which driving fluid from the outlet conduit 9 is discharged.

First and second by-pass ports 18 and 19, formed respectively in the inlet and outlet conduits 10 and 9, are interconnected by a reverse by-pass conduit 20 to allow pressurised air to flow from the inlet conduit 10 to the outlet conduit 9, in the opposite direction to the direction of capsules 3 moving through the transfer conduit 5 from the upstream portion 4 of the pipeline to the downstream portion 6 of the pipeline.

A valve member 17 is pivoted about a horizontal axis which passes through the centre of gravity of the valve member 17 and is adjacent the upstream edge 12 of the inlet port 11. The valve member 17 is so arranged that when pressurised air from the fan 36 if flowing through the inlet conduit 10 to the downstream portion 6 of the pipeline, the centre of pressure exerted by the flow of air is disposed below the pivotal axis of the valve member 17, thus urging the valve member 17 into a first, closed position, as shown in the drawing, in which a first end 21 of the valve member 17 closes the downstream end 8 of the transfer conduit 5, but allows some leakage in an upstream direction past the valve member 17. At the same time, the opposite or second end 22 of the valve member 17 closes the first by-pass port 18. As shown, the first and second ends 21 and 22 of the valve member 17 co-operate with resilient sealing members 38 and 39 so as to provide more effective sealing of the transfer conduit 5 and the reverse by-pass conduit 20.

In order to direct the air flow through the inlet conduit 10 in a manner such that the centre of pressure is disposed below the pivotal axis of the valve member 17, an arcuate guide vane 27 extends across the inlet conduit 10, adjacent the second end of the valve member 17, along an axis which extends perpendicular to a plane containing the axis of the transfer conduit 5 and the inlet conduit 10. This guide vane 27 may be disposed at any point between the centre line of the inlet conduit 10 and the side of the inlet conduit 10 formed with the first by-pass port 18. That is to say, between the position in which the guide vane 27 is shown in unbroken outline in the drawing and the position in which it is shown in broken outline. The inlet conduit 10 and the valve member 17 are arranged so that, when the valve member 17 moves into its second, open position, the first end 21 extends into the inlet port 11 so as to allow passage of a capsule 3 into the downstream portion 6 of the pipeline. The gap between the outer edge 23 of the first end 21 of the valve member 17 and the adjacent surface of the inlet conduit 10 should be at least 0.1 times the diameter of the transfer conduit 5 so as to allow passage of fluid from the fan 36 past the first end 21 of the valve member 17 without inducing large closing forces on the valve member 17 and to ensure the communication of pressure variations resulting from the transit of a capsule 3. These pressure variations initiate the closure of the valve member 17 at the proper time and are brought about by the interaction of flow existing in the transfer conduit 5 with the presence of a capsule 3 within the transfer conduit 5.

As shown, when the valve member 17 is in its second, open position, the second end 22 extends along the reverse by-pass conduit 20 and seats in a damper box 26. The damper box 26 consists of an enclosure having the same shape as the second end 22 of the valve member 17, but having upstanding peripheral edges 40 which are spaced from the peripheral edges of the second end 22 of the valve member 17 when the valve member 17 is in its second, open position. At least some of these upstanding peripheral edges 40 may be provided by the walls of the reverse by-pass conduit 20, but one of these edges 40 may be movable so as to adjust the damping resistance of the damper box 26. Thus, as the second end 22 of the valve member 17 swings into the damper box 26, air between the valve member 17 and the base of the damper box 26, provided by a flat surface attached to the top wall of the transfer conduit 5, can only escape through the small clearance spaces between the second end 22 of the valve member 17 and the upstanding edges 40.

In order to expedite closure of the valve member 17 from its second, open position to its first, closed position, part of the reverse by-pass conduit 20 adjacent the first by-pass port 18 has a bulbous portion 25 which is shaped so that, as the valve member 17 pivots through a given angle, in moving from its second, open position to its first, closed position, the flow path between the outer edge 24 of the second end 22 of the valve member and the adjacent bulbous portion 25 of the reverse by-pass conduit is equal to or greater than the space between the outer edge of the second end 22 and the first by-pass port 18. As shown in the drawing, this may be conveniently achieved by shaping the bulbous portion 25 of the reverse by-pass conduit 20 so that cross-sections extending perpendicular to the pivotal axis of the valve member 17 are in the shape of arcuate curves to which a plane, bounded by the edges of the first by-pass port 18 is tangential.

In order to restrict flow of air through the reverse by-pass conduit 20, when the valve member 17 is moving from its second, open position to its first, closed position and the fan 36 is blowing pressurised air into the downstream portions of the pipeline and through the reverse by-pass conduit 20, the reverse by-pass conduit 20 is provided with wire mesh screening 41 disposed between the enlarged portion of the reverse by-pass conduit 20 and the second by-pass port 19 and provides a flow cross-section equal to 0.6 times the cross-section of the first by-pass port 18.

In operation of the pipeline, when a capsule 3 is travelling in the upstream portion 4 towards the pressurising station 1, air pushed in front of the capsule discharges from the pipeline through the outlet conduit 9 and the pressure in the pressurising station on the upstream side of the valve member 17 is approximately equal to the pressure at the inlet port 35 of the fan 36. Pressurised air issuing from the discharge port 37 of the fan 36 passes through the inlet conduit 10 in such a way as to urge the valve member 17 into its first, closed position as shown in the drawing. Any pressurised air leaking past the first end 21 of the valve member 17 into the upstream end 7 of the transfer conduit 5 immediately drops in pressure to the approximate value of pressure at the inlet port 35 of the fan 36.

However, as soon as the leading end of a capsule 3 enters that part of the transfer conduit 5 between the upstream edge 12 of the inlet port 11 and the downstream edge 16 of the outlet port 14, further movement of the capsule 3 towards the valve member 17 causes an increase in the pressure on the upstream side of the first end 21 of the valve member 17, thus upsetting the equilibrium of the valve member 17. In addition, even if the capsule 3 is stationary or moving so slowly towards the valve member 17 that the resultant rise in pressure is avoided, the permitted leakage of pressurised air from the downstream side of the valve member 17 will cause sufficient increase in pressure on the upstream side of the valve member 17 to destabilise the valve member 17. As soon as the pressure on the upstream side of the first end 21 of the valve member 17 rises above the pressure at the inlet port 35 of the fan 36, the valve member 17 will commence to move from its first, closed position to its second, open position and any movement in this direction has the effect of causing further such movement. Thus, an opening of the valve member 17 results in a greater air pressure on the upstream side of the first end 21 of the valve member 17. Similarly as the second end 22 of the valve member 17 moves away from the first by-pass port 18, pressurised air commences to flow from the inlet conduit 10 into the reverse by-pass conduit 20 and this flow of pressurised air, and the concomitant reduction in the flow of pressurised air into the downstream portion 6 of the pipeline causes an acceleration of the anti-clockwise rotation of the valve member 17 into its second, open position. When in this position, the valve member 17 permits passage of the capsule 3 into the downstream portion 6 of the pipeline. Flow of pressurised air into the downstream portion 6 of the pipeline is restricted and so the pressurised air flows through the reverse by-pass conduit 20 back into the inlet port 35 of the fan 36, this flow of air acting to hold the valve member 17 in its second, open position. As illustrated, the guide vane 27 is so arranged that, when the pressurised air is flowing from the inlet conduit 10 into the reverse by-pass conduit 20, the flow is sufficiently inclined to the guide vane 27 as to permit separation of flow around the guide vane 27, thus reducing the effect of the guide vane 27 on the direction of flow of pressurised air. In this manner, the assistance in causing closure of the valve member 17 effected by the vane 27 is enhanced when flow around the guide vane 27 is attached to the guide vane 27 and is diminished when the valve member 17 is in its second, open position.

Once the trailing end of the capsule 3 has moved beyond the outer edge 23 of the first end 21 of the valve member 17, pressurised air passing through the gap between this edge 23 and the adjacent surface of the inlet conduit 10 falls in pressure to substantially the pressure at the inlet port 35 to the fan 36. The resultant difference in pressure on opposite sides of the first end 21 of the valve member 17 causes the valve member 17 to move from its second, open position towards its first, closed position and, as this movement progresses, the influences promoting this movement are increased. Thus, as the gap between the outer edge 23 of the first end 21 of the valve member 17 and the adjacent surface of the inlet conduit 10 increases, so does the flow of pressurised air through this gap and this flow of pressurised air has the effect of causing further clockwise rotation of the valve member 17. The valve member 17 therefore returns to its first, closed position, as illustrated in the drawing, as soon as the capsule 3 passes through the air pressurising station 1. At this stage, the turning movement exerted by the air flow on the first end 21 of the valve member 17 is more than the turning moment exerted by the air flow on the second end 22. However, the difference in these turning moments is preferably less than 10%.

We claim:

1. A fluid pressurising station, for a pipeline conveyor in which load-carrying capsules are conveyed along a pipeline by means of a fluid flowing along the pipeline, comprising:
    a transfer conduit having upstream and downstream ends respectively connectable to upstream and downstream portions of the pipeline for the passage of load-carrying capsules;
    outlet and inlet conduits respectively connected to the upstream and downstream ends of the transfer conduit to allow fluid to flow from the upstream portion of the pipeline and to allow pressurised fluid to be fed into the downstream portion of the pipeline;
    an inlet port interconnecting the inlet conduit and the downstream end of the transfer conduit and having upstream and downstream edges at the intersection between the inlet conduit and the downstream end of the transfer conduit;
    an outlet port interconnecting the outlet conduit and the upstream end of the transfer conduit and having upstream and downstream edges at the intersection between the outlet conduit and the upstream end of the transfer conduit; and
    a valve member mounted for pivotal movement about an axis extending transversely of the transfer conduit at or adjacent the upstream edge of the inlet port;
    and comprising the improvement wherein:
    first and second by-pass ports are respectively formed in the inlet and outlet conduits;
    a reverse by-pass conduit extends between the first and second by-pass ports;
    the first by-pass port has an edge at or adjacent the upstream edge of the inlet port; and
    the valve member has first and second opposite ends, said valve member being moveable into a first, closed position in which the opposite ends extend across the transfer conduit to at least partially close the transfer conduit and close the first by-pass port as a result of fluid entering the downstream end of the transfer conduit through the inlet conduit whenever the transfer conduit between the upstream edge of the inlet port and the downstream edge of the outlet port is free of capsules, said valve member being moveable into a second, open position in which the opposite ends of the valve member respectively extend into the inlet port and along the reverse by-pass conduit as a result of movement of part of a load-carrying capsule into part of the transfer conduit between the upstream edge of the inlet port and the downstream edge of the outlet port and consequent fluid flow through the reverse by-pass conduit from the inlet conduit to the outlet conduit.

2. A fluid pressurising station, according to claim 1, wherein:
    the first and second opposite ends of the valve member have outer edges, respectively; and
    the reverse by-pass conduit has a bulbous portion adjacent the first by-pass port so that, as the outer edge of the second end sweeps across a surface of revolution during final closing movement of the valve member away from its second, open position towards it first, closed position, the space between the outer edge of the second end of the valve member and the bulbous portion remains equal to or greater than the space between the outer edge of the second end of the valve member and the first by-pass port.

3. A fluid pressurising station, according to claim 2, wherein the reverse by-pass conduit has a restricted cross-section between said bulbous portion and the second by-pass port.

4. A fluid pressurising station, according to claim 1, 2 or 3 wherein the first end of the valve member does not completely close the transfer conduit when the valve member is in its first, closed position, but allows controlled leakage from the downstream end of the transfer conduit to the upstream end of the transfer conduit.

5. A fluid pressurising station, according to claim 1, 2 or 3, wherein fluid damping means are provided on the transfer conduit for receiving the second end of the valve member on movement of the valve member from its first, closed position to its second, open position.

6. A fluid pressurising station, according to claim 1, 2 or 3, wherein at least one guide vane extends across the inlet conduit along an axis which is perpendicular to a plane containing the axes of the transfer conduit and the inlet conduit.

* * * * *